Jan. 4, 1966 G. F. ORR 3,226,807
METHOD OF CONSTRUCTING A CONTINUOUS PIPELINE
Original Filed June 15, 1961

INVENTOR.
BY GEORGE F. ORR
Henry Kozak
ATTORNEY

United States Patent Office 3,226,807
Patented Jan. 4, 1966

3,226,807
METHOD OF CONSTRUCTING A CONTINUOUS PIPELINE
George F. Orr, Solon, Ohio, assignor to Hill Hubbell Company, Cleveland, Ohio, a corporation of Ohio
Original application June 15, 1961, Ser. No. 117,304. Divided and this application Jan. 20, 1964, Ser. No. 345,824
2 Claims. (Cl. 29—157)

This application is a division of application Serial No. 117,304, filed June 15, 1961, now abandoned.

This invention relates to the production of coated pipes suitably conditioned for end-to-end welding into a pipe line. Of particular concern is the production of pipes which are coated, except for small exterior outside areas, adjacent each end.

In the manufacture of coated pipes and their assembly into pipe lines, there arises the problem of providing peripheral uncoated areas adjacent each end of each pipe having the base material of the pipe free of all coating material, corrosion, or dirt which might contribute to forming inferior joints connecting adjacent pipes. Clean welding surfaces are necessary so as to avoid the inclusion of foreign matter in the welded joints and to avoid the production of fumes which are unpleasant and often noxious to workmen.

By conventional procedure, the entire outer surface of each pipe is coated and then the coating is peeled along a few inches of the length of the pipe as measured from each end to expose the base material of the pipe. By this practice, the base material is maintained free of dirt and corrosion until used in constructing a pipe line.

The common practice is to manually strip or scrape the coating from the base material just before incorporation of the pipe into a line and to thereby expend considerable labor and time in preparing the pipe for a line construction operation, such as welding. As a practical matter, complete cleanliness of the base material is difficult to obtain under field conditions.

Hence, an important object of this invention is to provide a method of constructing completely coated pipes of which the base material forming the exterior wall areas adjacent the ends of such sections may be momentarily placed in a condition free of any material detrimental to the joining of the pipes.

It is an object of this invention to enable the welding together of precoated pipes more economically than heretofore into a pipe line wherein the weld joints are of high uniform texture and quality.

A further object is to facilitate the construction of welded pipe lines with less labor and cost.

These objects are in general achieved by providing pipes which are completely coated, and may remain so until the instant of welding, but are momentarily adaptable for welding by removal of a sleeve of heat-shrinkable material stretched tightly about the base material of the pipe forming each end portion thereof.

In a preferred embodiment, the sleeve comprises a thin-walled thermoplastic material, such as polymerization product predominately of a vinyl halide, substantially nonadherent with respect to the basic pipe material. The sleeve is useful for receiving any coating material incidentally spread thereon to obtain satisfactory coating of the surface of the pipe not covered by the sleeve and for protecting the sleeve between the time of coating and the time of pipe-line construction.

In accordance with this invention, pipes coated in the foregoing manner are assembled into a pipeline with the sleeves and the coating material carried thereon removed but with another sleeve of similar heat shrinkable material stored in loosely fitting arrangement on, and surrounding, a coated portion of a pipe. As successive pipes are welded together, or after the entire pipeline is assembled, each one of the second mentioned sleeves may be centered over a weld joint with its ends overlapping coated areas of the pipes adjacent the joint and shrunk into stretched relation with the pipeline by the application of heat.

In the drawing in respect to which this invention is described:

Figure 1:
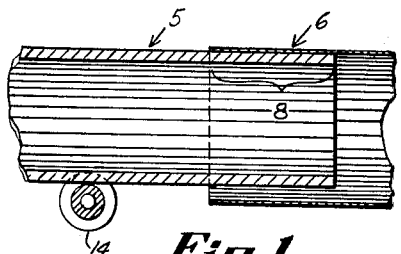
FIG. 1 is a fragmentary longitudinal elevation in section illustrating a pipe with a heat shrinkable sleeve supported on the end portion of the pipe.
Figure 2:
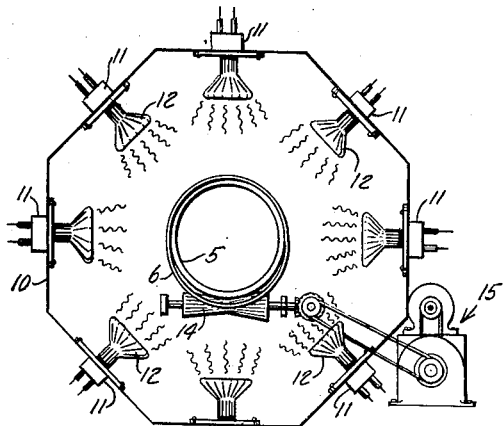
FIG. 2 is an end view of the pipe and sleeve shown in FIG. 1 with the pipe supported on rollers and the sleeve surrounded by a heating device.

FIGS. 1 to 6 depict a pipe 5 and a sleeve 6 utilized in this invention to maintain the end portion 8 of the pipe free from any foreign material detrimental to its installation in a pipeline through any ordinary processing, transportation, or storage condition. An initial step in preparing a pipe in accordance with the invention is to place the sleeve 6 over the end portion 8 in loosely fitting relationship, as shown in FIGS. 1 and 2. The sleeve 6 is obtained as a short length of an extruded plastic tubular product having an internal periphery sufficiently larger than the external periphery of the pipe to enable easy application. A satisfactory composition of which the sleeve 6 consists in practicing this invention is a copolymer of 80 parts vinyl chloride and 20 parts vinyl acetate mixed with a plasticizer, diisodecyl phthalate in 100 to 30 copolymer to plasticizer ratio. The proportions just expressed are typical but non-critical with respect to others that may be employed.

The next step is illustrated in FIG. 2 in which heat is applied in a uniform manner to the external surface of the sleeve to reach a temperature short of the melting temperature of the sleeve material to induce shrinking. Illustrative of the heating devices that may be used is the shroud 10 with eight lighting fixtures 11 projecting therethrough and supporting bulbs 12. The device should be capable, for example, of heating sleeves of vinyl-type polymerization products to 225°–250° F. The pipe 5 is supported by means, such as a plurality of rollers similar to the roller 14 along portions of the pipe inwardly of its length from the sleeve 6. The pipe is advanced longitudinally through the heating device by means such as the motor and gear reduction unit 15 connected with the roller 14 by a bevel gear and sprocket transmission system, as shown.

The sleeve 6 may comprise any one of the thermoplastic heat-shrinkable polymerization products well-known to the plastic art. Well-known for this property are vinyl resins of various types and particularly those containing vinyl halide and, more particularly, copolymers of vinyl chloride and vinyl acetate in which the vinyl chloride predominates. As some of the vinyl type resins, for example, unplasticized polyvinyl chloride and 70–30 vinyl chloride-vinyl acetate copolymer are somewhat stiff at room temperatures such resins may be modified with conventional plasticizers to provide such flexibility as will render them more adaptable for use in the present invention. These plastic compositions may be modified in any way desired as long as their capacity to shrink is not impaired. The heat shrinkable vinyl resins are also characterized by a lack of adhesion to metal at sub-fusion temperatures. Modifiers are preferably avoided which substantially affect that property.

Figure 3:
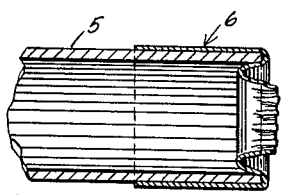
FIG. 3 is a fragmentary longitudinal elevation in section of the pipe and sleeve of FIG. 1 showing the sleeve shrunken to a tightly stretched condition about the pipe.
Figure 4:
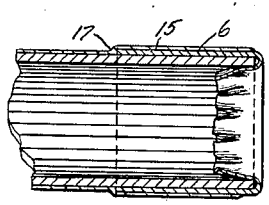
FIG. 4 is a fragmentary longitudinal elevation in section showing the pipe and sleeve of FIG. 3 after receiving a layer of coating material.

After the sleeve 6 is shrunken tightly about the pipe, as shown in FIG. 3, the pipe is ready for application of the coating material normally applied to pipe for resistance against severe corrosion conditions. In practice, the pipe is transferred longitudinally from the heating station of FIG. 2 into a conventional coating machine, e.g., the type illustrated in Weland et al. 1,862,837, or a conventional coating and wrapping machine as illustrated in Brend Patent No. 2,368,742. The coating step may also be carried out by flame gun application of organic plastics in equipment well-known to the coating art, or by application of heat by any of the well-known procedures of spraying, spreading, or dipping techniques. The coating 15 may overlap the sleeve 6 as shown and to any extent desired in order to achieve uniform thickness of the coating on the areas of the pipe not covered by the sleeve 6.

Figure 5:
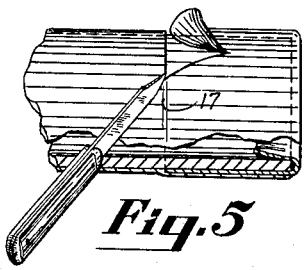
FIG. 5 is a fragmentary longitudinal elevation, partially in section, illustrating a step in the removal of the sleeve of the coated pipe as shown in FIG. 4.

After the coating step, preferably after the coating 15 has hardened or dried, the sleeve or sleeves 6 may be removed from the pipe at any time by merely cutting through the coating, as shown in FIG. 5, along the contour line 17 occurring at the coated end of the sleeve. On account of the tightly-stretched condition of the sleeve, cutting thereof in the longitudinal direction of the pipe facilitates removal.

Due to the choice of material constituting the sleeve, e.g., a vinyl resin containing predominately vinyl chloride, the sleeve is non-adherent with respect to the metallic surface of the pipe and separates with ease, and leaves the surface of the pipe in the precise surface condition it had when receiving the sleeve. Generally speaking, the sleeve of the pipe will not be removed until installation in a pipeline in order to avoid any damage to the end portions of the pipe normally possible in handling, transit and storage. For example, protection is provided in the ordinary and frequent occasion wherein the pipe ends are thrust, into, or placed in contact with, the ground during their distribution along a pipeline site several days before the pipes are welded into the pipeline.

The plastic material of the sleeves assures tightness against the pipe, resistance to abrasion, and imperviousness to atmospheric and soil components.

Figure 6:
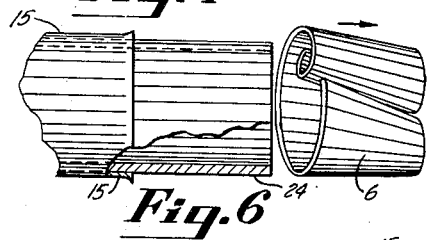
FIG. 6 is a fragmentary longitudinal elevation in section of the coated pipe of FIGS. 4 and 5 with the sleeve removed.
Figure 7:
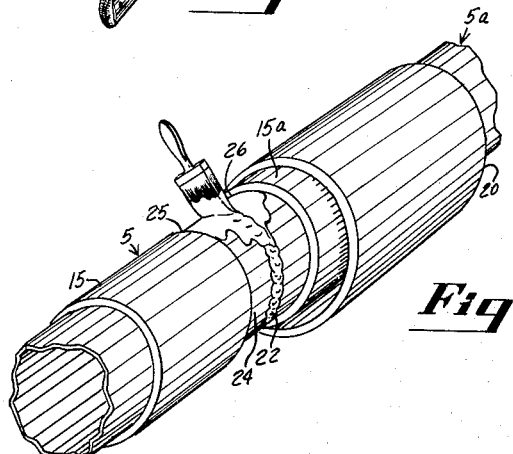
FIG. 7 is a fragmentary perspective view of two pipes similar to the one shown in FIG. 6 welded together and one of the pipes carrying a loosely fitting sleeve over the coated portion thereon.
Figure 8:
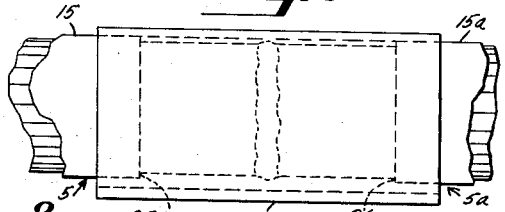
FIG. 8 is a fragmentary elevation of the pipe line shown in FIG. 7 with the sleeve in centered position over the weld-joint.
Figure 9:
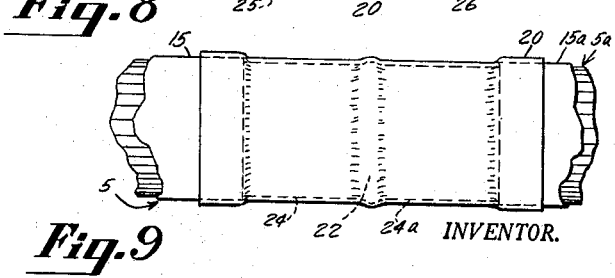
FIG. 9 is a fragmentary elevation of the pipeline of FIGS. 7 and 8 with the sleeve shrunken into tightly-fitting relation with uncoated areas adjacent the weld-joint and marginal coated areas adjacent the uncoated areas.

FIGS. 7 to 9 illustrate the integration of coated pipes into an assembled, completely coated or covered pipeline as illustrated in FIG. 9. To attain such assembly by welding the pipes together, it is necessary to position joint-covering sleeves similar to a sleeve 20 on the pipes 5 prepared as shown in FIG. 6, in some manner that a sleeve 20 will be available, as the pipeline is progressively constructed, to cover the exposed base pipe areas adjacent each welded joint. The preferable pactice is to install a sleeve 20 on the coated area of each pipe before it is welded into the pipeline. The sleeve remains out of proximity with the welding operation since any substantial heating preliminary to its positioning over the welded area would be detrimental to its installation.

FIG. 7 illustrates two pipes 5, 5a united by a weld joint 22. Areas 24, 24a are exposed metal surfaces of the pipe disposed between extremities 25 and 26 of the coating of the two joined pipes. At this stage in the construction of the pipeline, it is highly important to provide against access of atmosphere, soil solutions, condensation, etc., through pin holes or other openings inadvertently occurring through or adjacent the sleeve 20 after being shrunk into place. Accordingly, the areas 24 and 24a are coated with a primer 19 (described below in greater detail) applied as by brushing, as shown in FIG. 7.

The sleeve 20 comprises a material which may be identical in composition with the sleeve 6 since similar reaction to heat and resistance to corrosion and moisture permeation are required. However, whereas nonadhesion of the sleeve 6 for the pipe is desired, the sleeve 20 is permanently attached and preferably bonded to the pipe 5. The sleeve 20 may occupy an out-of-way position on the coating 15, such as shown in FIG. 7 during and immediately after welding together of the pipes 21. Soon after the welding and priming operations, the sleeve 20 may be shifted to the position shown in FIG. 8 wherein its end portions extend past the coating edges 25 and 26 and overlap one or two inches of the coating area 15 of each pipe. With careful timing, it is possible to utilize the heat stored in the pipe areas 24, 24a to bring about shrinkage of the sleeve 20 into the tightfitting stretched relationship shown in FIG. 9. This figure illustrates that the sleeve 20 has shrunken to such an extent as to be formed in tight conformity with the exterior surface of the coating 15, 15a of each pipe and to the previously exposed areas 24, 24a of slightly less diameter than the coated area. In the event that heat stored in the pipeline was not utilized in the manner just described, portable heating devices may be employed. One preferred type is that which at least partly encircles the pipe and discharges a heated, flameless, dry gas. Portable radiation type heaters of the general type illustrated in FIG. 2 may also be used.

The primer 19, applied prior to final positioning of the sleeve 20, is preferably of a material which bonds firmly with the sleeve and base material or the pipe, particularly the latter, in order that corrosive action may not spread from e.g., a chance point of exposure of the base material such as that resulting from a pinhole in the sleeve 20.

One of the cheapest priming materials available is asphalt which must be either heated or mixed with solvents to be readily applicable. Under service conditions which warrant the expense of an extremely firm bond of the sleeve 20 with the base material, adhesives may be used based upon certain plastics that have an affinity both for steel and the vinyl chloride polymers and copolymers. Examples of plastic materials providing good vinyl-to-metal bonding as the basic component of an adhesive are:

(1) the epoxies (e.g., as derived from biphenol A and epichlorohydrin) and used in combination with a suitable cold-setting curing agent such as an aliphatic amine;

(2) polyesters in combination with suitable cold-setting catalysts well-known to the art; and (3) mixtures of resins, e.g., epoxy-polyamide mixtures.

The plastic-type adhesives are provided preferably in viscosities varying from viscous liquid to paste-like consistency adapting them for field application by brushing, spraying or troweling. Because of the undesirability of introducing any moisture under the highly moisture impervious sleeve 20, solution-type adhesive depending for their fluidity on organic solvents are preferred over emulsion-type adhesives, and those resin-forming materials that yield water as a condensation product during curing.

In view of the usual practice of coating and taping the exposed metal areas adjacent to a welded pipe joint, the foregoing discloses an extremely advantageous procedure with respect to time, labor and expense. Moreover, as minute air leaks following the lines of overlap in a spirally taped joint have in the past contributed substantially to joint corrosion, the present invention assures the construction of trouble-free joint coverings requiring less skill and care in their preparation.

The terms and expressions which have been employed are used as terms of description and not of limitation, and there is no intention of excluding such equivalents of the invention described or of the portions thereof as fall within the scope of the claims.

What is claimed is:

1. A method of constructing a continuous pipeline of a plurality of pipes comprising the steps of: providing thin-walled sleeves of heat-shrinkable organic thermoplastic material which is substantially non-adherent with respect to material of the pipes; placing one of said sleeves over a short length of each pipe contiguous with each end; heating the sleeves so placed to shrink them tightly about the end portions of the pipe; applying a coating material to the pipe between said sleeves stretched thereon and to an extent overlapping said sleeves; removing the sleeves from each pipe after the coating step along with coating material carried thereon; after the coating step, placing another sleeve of heat-shrinkable organic thermoplastic material of length exceeding twice the length of one said exposed end portion and adapted to fit loosely around a portion of the pipe carrying said coating material around the coated portion of one of said pipes; welding the pipes in end-to-end relationship; placing said other sleeve carried on each pipe over contiguous uncoated pipe end portions joined together with the sleeve overlapping the coated areas of the adjacent pair of pipes; and applying heat to said sleeve placed over said contiguous pipe portions to shrink the sleeve thereabout in overlapping relation with said coated areas.

2. The method of claim 1 comprising: applying a liquid-to-paste-like adhesive material to said uncoated pipe portions between said welding step and said sleeve-positioning step.

References Cited by the Examiner
UNITED STATES PATENTS

| | | |
|---|---|---|
| 1,120,731 | 12/1814 | McIlroy. |
| 2,027,962 | 1/1836 | Currie. |
| 2,118,073 | 5/1838 | Dittmeyer |
| 2,786,264 | 3/1957 | Colombo _____ 29—460 X |
| 3,068,563 | 12/1962 | Reverman _____ 29—458 |
| 3,138,861 | 6/1964 | Gaido _____ 29—475 |

WHITMORE A. WILTZ, *Primary Examiner.*

CHARLIE T. MOON, *Examiner.*